No. 12,806. REISSUED JUNE 2, 1908.

A. C. SCHAEFER.

PACKING FOR PISTON RODS.

APPLICATION FILED MAR. 16, 1908.

2 SHEETS—SHEET 1.

WITNESSES
M M Walstrom
J A Byington

INVENTOR
AUGUST C. SCHAEFER
BY Paul & Paul
HIS ATTORNEYS

No. 12,806. REISSUED JUNE 2, 1908.
A. C. SCHAEFER.
PACKING FOR PISTON RODS.
APPLICATION FILED MAR. 16, 1908.
2 SHEETS—SHEET 2.
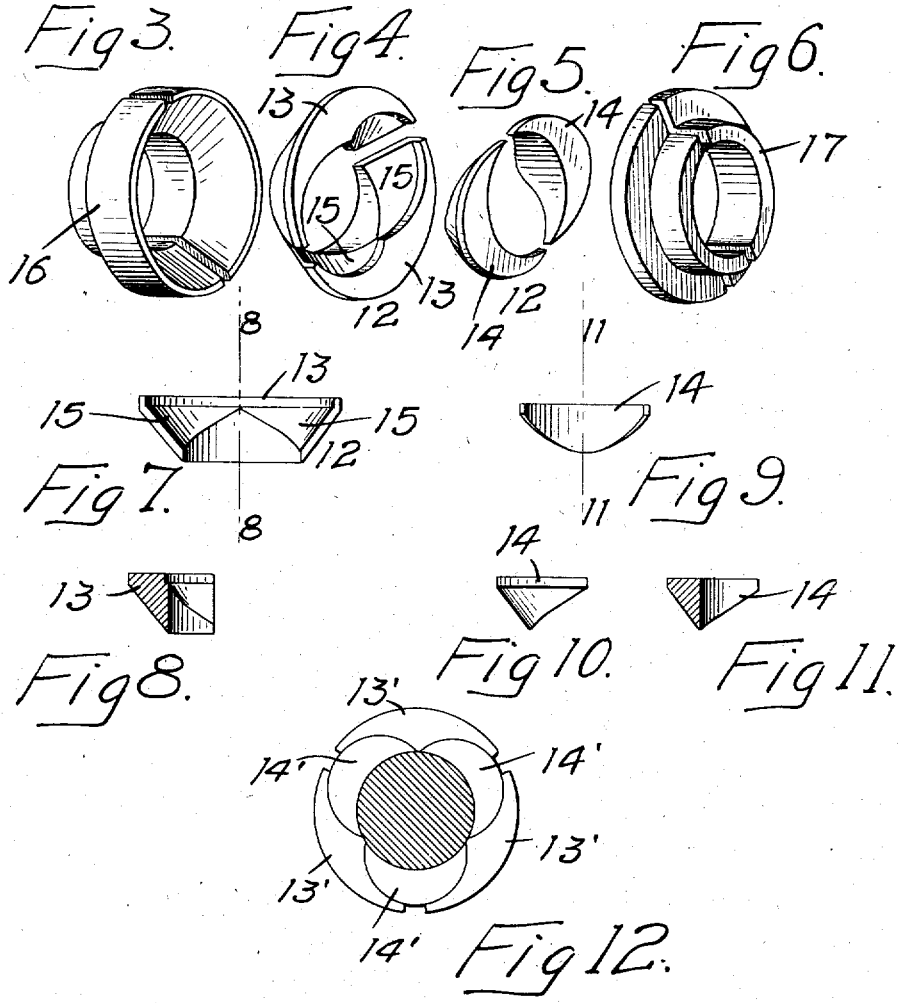
WITNESSES
J. W. Walstrom
J. A. Byington
INVENTOR
AUGUST C. SCHAEFER
BY Paul & Paul
HIS ATTORNEYS

UNITED STATES PATENT OFFICE.

AUGUST C. SCHAEFER, OF OELWEIN, IOWA, ASSIGNOR OF ONE-HALF TO WALTER P. CHRYSLER, OF OELWEIN, IOWA.

PACKING FOR PISTON-RODS.

No. 12,806. Specification of Reissued Letters Patent. Reissued June 2, 1908.

Original No. 871,068, dated November 12, 1907, Serial No. 360,063. Application for reissue filed March 16, 1908. Serial No. 421,593.

*To all whom it may concern:*

Be it known that I, AUGUST C. SCHAEFER, a citizen of the United States, residing at Oelwein, in the county of Fayette and State of Iowa, have invented new and useful Improvements in Packing for Piston-Rods, of which the following is a specification.

My invention relates to a packing designed particularly for piston rods but capable of use in other ways.

The object of the invention is to provide a packing of simple construction and one that is very effective in action and operates with but little friction.

A further object is to provide a packing having means to compensate for wear.

In a broad sense the invention consists in an inner and outer series of segmental elements, the elements of each series having inner faces forming a cylindrical bearing surface for a rod or a shaft, the inner series being inclosed by the outer one or fitting within pockets provided in said outer series. The packing is cone-shaped and the elements of the inner and outer series are so arranged with respect to one another that each element of one series laps by or covers a joint between a pair of elements of the other series.

Further, the invention consists more specifically in an inner series of packing elements having outer curved faces and an outer series of packing elements having curved recesses or pockets to receive the elements of the inner series.

Further, the invention consists in various constructions and combinations, all as hereinafter described and particularly pointed out in the claims.

Figure 1:
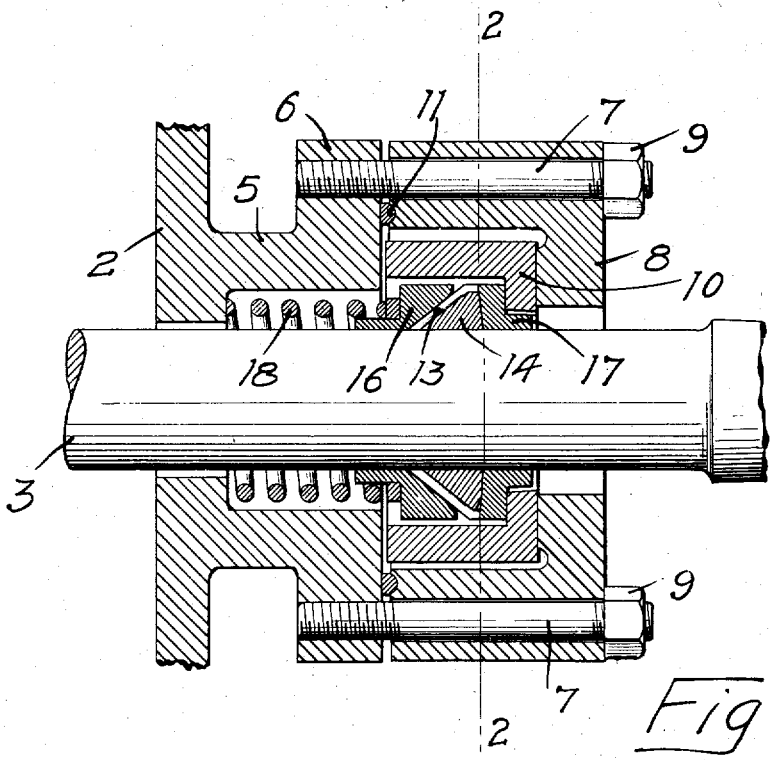
Figure 2:
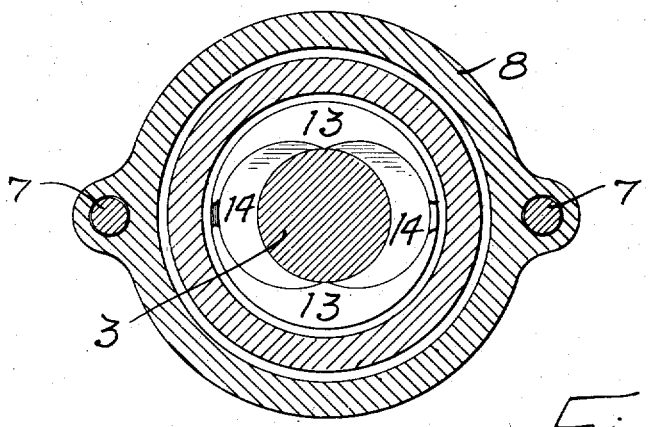

In the accompanying drawings forming part of this specification: Figure 1 is a longitudinal central sectional elevation of a portion of a cylinder, portion of a piston rod, and a packing involving my invention. Fig. 2 is a vertical section on the line 2—2 of Fig. 1, looking toward the left in said Fig. 1. Figs. 3 to 6 are perspective views, Fig. 3 being a follower cone, Figs. 4 and 5 the segments of the packing proper separated, and Fig. 6 the reducing bushing. Fig. 7 is an inside face view of one of the segments of said packing proper. Fig. 8 is a cross section on the line 8—8 of Fig. 7. Fig. 9 is a view corresponding to Fig. 7 of one of the small segments of said packing proper. Fig. 10 is a side elevation of one of said small segments. Fig. 11 is a cross section on the line 11—11 of Fig. 9. Fig. 12 is a detail view of a modified form of packing proper.

Like characters refer to like parts throughout the several figures.

The device includes in its make-up a packing proper which, for convenience, I will hereafter refer to simply as "the packing," and this I prefer to make of cone-form in a plurality of inner and outer segments. All of these segments may be of some soft composition metal, or the inner series of them may be of some harder metal such as brass, cast iron or the like. In Fig. 1 in the drawings I have shown in part a steam engine cylinder which will be designated by 2. In fact, in this particular figure I have shown but a portion of one of the heads of said cylinder, the piston not appearing. Through the head of said cylinder 2 is movable the piston rod 3 which extends outward through a boss as 5 on the said cylinder head and which has an annular external flange as 6 into which are tapped several bolts or screws as 7. I may employ but two of these bolts or screws as shown in both Figs. 1 and 2. These bolts or screws 7 serve as a means for associating the gland 8 with the boss 5, they projecting through opposite lugs or ears on the gland, as shown clearly in Fig. 2. The screws or bolts are provided with nuts 9 at their outer ends, which, when turned home, hold the cup-like gland on the two screws. As usual, the rod 3 moves through a perforation or hole in the gland.

I may provide within the gland 8 a vibrating cup 10. The inner edge of said gland 8 is jammed solidly against the outer face of the boss 5 by the nuts 9. Preferably I place a packing 11 between the said gland and the boss 5, and this packing may be seated in an annular channel in the inner end of said gland. In this way I prevent leakage when the parts are subjected to a rocking motion as on a locomotive. This also provides for relative movement of certain parts hereinafter described incased in said gland.

The soft metal composition packing is denoted in a general way by 12, it consisting preferably of a number or series of inner and outer segments which under the pressure of steam are caused to hug in a steam-tight manner the piston rod 3 which said packing 12 surrounds. The segments of said packing 12 are so related that, when they are operatively assembled, they present interiorly a cylindrical formation or one that is circular in cross section, as shown in Fig. 2, to conform to the cross sectional shape of the rod 3. Externally said packing 12 is of conical form, the reduced or small end facing the cylinder 2. The said packing 12 may be composed of any desirable number of sections, for example, four, as shown in Figs. 4 and 5, or six, as indicated in Fig. 12.

The packing 12 shown in Figs. 4 and 5 consists of two large outer segmental elements of duplicate construction, each designated by 13, the ends of which segments are illustrated as squared off, and two inner or smaller segments of similar construction each designated by 14 and all of them as will be understood, taper externally from their outermost faces. The outer series of segments have recesses 15 with curved walls corresponding substantially to the section of a sphere and each of the smaller segments 14 fits at its outer ends in two opposite recesses 15 so that the inner faces of the several segments are brought into coincidence and present in effect a continuous circular wall surrounding the rod 3. The outer series of segments inclose the inner ones and the segments of the two series interlock and prevent relative rotary movement, and the elements of each series overlap adjacent elements of the other series. The smaller segments 14 are so fitted in the recesses 15 as to leave clearance space between the opposite ends of the larger or outer segments 13, as clearly shown in Fig. 2, thereby to provide for taking up wear in the packing caused by the action of the piston rod 3. The series of inner segmental elements fitting within recesses in the outer segmental elements have their faces at the end of the packing in the same plane or flush with the corresponding faces of the outer series, so that the flat faces of both sections will bear evenly against the face of the reducing bushing as will hereinafter appear.

The pockets or recesses in the outer series of segmental elements decrease in depth inwardly and the inner series of segmental elements are tapered to fit within these pockets. The packing thus provided, when combined with a suitable cup and seat is capable of both radial and longitudinal movement to take up wear, the several segments fitting snugly upon each other and all joints being closed. It is to be noted also that the segments of the outer and inner series are so arranged with respect to one another that each segment of a series laps by and covers the joint between a pair of segments of the other series, thus forming a series of interlocking inner and outer segments to compose the cone-shaped packing.

The packing 12 is preferably fitted in a follower cone as 16 shown in its operative relation in Fig. 1, and this follower cone 16, as illustrated in Fig. 3, I generally make in sections, although this is not essential. The character of the follower cone depends on the nature of the piston rod. Although the packing cone 12 fits within the follower cone only the external conical faces of the outer segments 13 of said packing cone come into contact with the conical inner face of the follower cone, as shown clearly in said Fig. 1. The outermost surface of the packing cone 12 is adapted to abut against the head of the reducing bushing 17, the shank of said bushing surrounding the rod 3 and fitting a perforation in the bottom of the vibrating cup 10. All the outer faces of the segments 13 and 14 are in a common plane so as to present practically a continuous surface which follows the shape of the adjacent face of the head of said reducing bushing 17 and contacts evenly therewith.

I prefer to dispose within the boss or hub 5 a push spring as 18 bearing at its inner end against the cylinder 2 and at its outer end against the follower cone 16, and the latter may, as shown in Fig. 1, have a groove or channel to receive the outermost whirl or terminal portion of the coiled spring 18. Upon the introduction of pressure into the cylinder 2, such pressure acts against the follower cone 16 so as to thrust the same to the right in Fig. 1, said cone acting against the divided cone packing 12 and forcing the same solidly against the bushing 17 and at the same time constricting said packing 12 about the rod 3 so as to effectively prevent the passage of steam between said packing 12 and rod 3. On the exhaust of the cylinder, when the pressure is relieved from the follower cone 16 and naturally from the packing 12, the latter may expand to thereby release the rod 3 and permit its free movement when exhaust is taking place. The spring 18 prevents the shifting of the packing when the pressure is off. During the operation of the piston under the action of the steam, the packing 12 is properly closed and tightly seated upon the rod, and I compensate for wear between the rod and packing and between the packing and follower cone. I may make the angle of the packing cone of small extent or pitch, so as to produce thin pliable portions, or feather, or knife edges at the inner ends of the segments of said cone packing, which close effectively upon the rod under pressure and promptly release said rod during exhaust. By virtue also of this feature there is no possibility of the cone packing wedging in the follower cone. I need provide also but a small bearing of the packing on the rod, and the cone end of the conical packing faces the cylinder, thereby cutting off leakage more easily. When pressure is applied, the cone divides the force of the pressure between the inner face of the gland 8 and the rod 3. The outer face of the packing, as previously stated, is shaped to conform to the inner face of the head of the bushing 17, and this shape may be plain or curved.

The packing is simple in construction, can be inexpensively made, and prevents leakage.

In some cases, and as shown in Fig. 12, the divided cone packing may consist of more than four segments. In this figure I have shown said cone packing as consisting of three large segments 13′ and three small segments 14′, and one of these segments, for example one of the inner segments 14′, may be made of hard metal, such as brass or cast iron. I have mentioned one of several modifications of which the device is capable.

I claim as my invention:

1. A piston rod packing comprising at least two small segments and at least two large segments, the larger segments having pockets or recesses therein of uniform curvature or conforming to the section of a sphere, and the smaller segments fitting in said recesses, the packing presenting interiorly a substantially continuous wall, and being exteriorly of cone form.

2. A piston rod packing comprising at least two small segments and at least two large segments, the larger segments having recesses to receive the smaller segments, and the ends of the larger segments being squared off and separated from each other to provide clearance spaces, the outer faces of both the inner and outer segments being tapered, and the segments mating to present internally a substantially continuous wall and being externally of conical form.

3. The combination, of a cylinder, a piston rod extending through said cylinder, a divided conical packing around said rod, the reduced end of the packing facing the cylinder, said packing being composed of inner and outer segemnts which have tapering meeting faces, fixed means against which the packing abuts when under the operation of steam pressure, and a follower cone between the cylinder and packing to receive the latter.

4. The combination, of a cylinder a piston rod extending through the said cylinder, a divided conical packing around the said rod, the reduced end of the packing facing the cylinder, said packing being composed of inner and outer segments which have tapering meeting faces, fixed means against which the packing abuts when under the operation of steam pressure, a follower cone between the cylinder and packing to receive the latter, and a spring to act against the follower cone to prevent shifting of the packing when the pressure is off.

5. The combination, of a cylinder, a piston rod projecting through the head of the cylinder, a divided conical packing surrounding the rod, a follower cone to receive said packing, and a vibrating cup provided with a bushing surrounding the rod and against which said packing abuts.

6. The combination, of a cylinder, a piston rod projecting through the head of the cylinder, a divided conical packing surrounding the rod, a follower cone to receive said packing, a vibrating cup provided with a bushing surrounding the rod and against which said packing abuts, a coiled push spring surrounding the rod and acting against the cylinder and follower cone respectively, and a gland inclosing the vibrating cup and held to the cylinder in a steam-tight manner.

7. A metallic packing comprising an inner series of segmental elements and an outer series of similar elements inclosing said first series, the outer face of the packing being conical and the meeting faces of the inner and outer segments tapered, whereby the fluid pressure thereon causes the relative constriction of said inclosed and inclosing elements, substantially as described.

8. A metallic packing comprising an outer and an inner series of segmental elements, the elements of each series lapping by the joints between a pair of adjacent elements of the other series, and the meeting faces of the outer and inner series being tapered.

9. A metallic packing comprising an outer series of segmental elements and an inner series of segmental elements inclosed by said outer series, outer surfaces of the inner series having an interlocking engagement with inner surfaces of the outer series, substantially as described.

10. A metallic packing comprising an outer series of segmental elements, an inner series inclosed by said outer series, outer surfaces of the inner series having an interlocking engagement with inner surfaces of the outer series, and the outer faces of said outer and inner elements at one end of the packing being in substantially the same plane or flush with one another, whereby said elements will bear evenly on a contacting surface.

11. A metallic packing comprising an outer and an inner series of segmental elements, the outer series of elements having recesses formed therein to receive the inner series of elements, said recesses decreasing in depth toward the smaller end of said packing, said inner series of elements tapering to fit within said recesses, the outer face of the packing being conical.

12. A metallic packing comprising an outer and an inner series of segmental elements, the outer faces of the inner series interlocking with the inner faces of the outer series to prevent relative rotary movement, the elements of each series overlapping adjacent elements of the other series, the outer face of the packing being conical.

13. A piston rod packing comprising a plurality of outer segmental sections whose outer faces conform to sections of a cone and whose inner faces are curved to sections of a cylinder and having recesses extending inwardly from their edges and decreasing in depth, and a plurality of inner segmental sections each adapted to fit within recesses of adjacent outer sections, their inner faces being curved to sections of a cylinder.

In witness whereof, I have hereunto set my hand this 13th day of March, 1908.

AUGUST C. SCHAEFER.

In presence of—
S. L. JOHNSON,
T. L. WHEELER.